United States Patent
Shidlaghatta (10) Patent No.: US 10,824,973 B2
(45) Date of Patent: Nov. 3, 2020

(54) EXPERT RESPONSE TEAM ASSEMBLER SOLUTION

(71) Applicant: Prashanth Shidlaghatta, Bangalore Karnataka (IN)

(72) Inventor: Prashanth Shidlaghatta, Bangalore Karnataka (IN)

(73) Assignee: Unisys Corporation, Blue Bell, PA (US)

(*) Notice: Subject to any disclaimer, the term of this patent is extended or adjusted under 35 U.S.C. 154(b) by 420 days.

(21) Appl. No.: 15/062,710

(22) Filed: Mar. 7, 2016

(65) Prior Publication Data

US 2016/0189085 A1    Jun. 30, 2016

Related U.S. Application Data

(60) Provisional application No. 61/919,241, filed on Dec. 20, 2013.

(51) Int. Cl.
*G06Q 10/06* (2012.01)

(52) U.S. Cl.
CPC .............. *G06Q 10/063112* (2013.01)

(58) Field of Classification Search
CPC .......................................... G06Q 10/00–50/00
USPC .................................. 705/7.11–7.42
See application file for complete search history.

(56) References Cited

U.S. PATENT DOCUMENTS

| 5,802,493 | A | * | 9/1998 | Sheflott | G06F 16/00 705/1.1 |
| 5,862,223 | A | * | 1/1999 | Walker | G06Q 10/063112 705/50 |
| 6,356,909 | B1 | * | 3/2002 | Spencer | G06F 16/958 |
| 9,317,574 | B1 | * | 4/2016 | Brisebois | G06F 21/62 |
| 2002/0029161 | A1 | * | 3/2002 | Brodersen | G06Q 10/1093 705/7.14 |
| 2003/0093478 | A1 | * | 5/2003 | Hughes | G06Q 10/10 709/205 |
| 2004/0054649 | A1 | * | 3/2004 | Mehregany | G06Q 10/06311 |
| 2005/0228709 | A1 | * | 10/2005 | Segal | G06Q 10/063112 705/7.14 |

(Continued)

OTHER PUBLICATIONS

Andrea, Jennitta. "An agile request for proposal (RFP) process." Proceedings of the Agile Development Conference, 2003. ADC 2003. IEEE, 2003. (Year: 2003).*

(Continued)

*Primary Examiner* — Alan S Miller (57) ABSTRACT

Technology may be used to modify and improve the process of assembling a response. An automated proposal may be generated by storing databases with information regarding experts and their availability. The database may be generated by monitoring other server systems within a network, such as email and instant messaging systems. A method may include identifying topics of interest in a request for proposal; identifying a credible expert based, at least in part, on the identified key topics; accessing time availability of the credible expert; requesting approval from a supervisor for participation by the credible expert, wherein the approval request includes the time availability of the credible expert; and assembling a response to the request for proposal that identifies the credible expert when approval from the supervisor is received.

10 Claims, 7 Drawing Sheets

(56) References Cited

U.S. PATENT DOCUMENTS

| | | | | |
|---|---|---|---|---|
| 2008/0114628 A1* | 5/2008 | Johnson | ........... | G06Q 10/06311 707/792 |
| 2009/0083229 A1* | 3/2009 | Gupta | ..................... | G06F 16/48 |
| 2010/0094859 A1* | 4/2010 | Gupta | ................... | G06F 16/907 707/709 |
| 2010/0106550 A1* | 4/2010 | Duke | ..................... | G06Q 40/00 705/35 |
| 2012/0041769 A1* | 2/2012 | Dalal | ................... | G06Q 10/101 705/1.1 |
| 2012/0317102 A1* | 12/2012 | Hu | ........................ | G06Q 10/00 707/723 |
| 2015/0339616 A1* | 11/2015 | Pursche | ................. | G06F 16/00 705/7.14 |
| 2016/0005000 A1* | 1/2016 | Ross | ................. | G06Q 10/1053 705/321 |
| 2016/0189085 A1* | 6/2016 | Shidlaghatta | .. | G06Q 10/063112 705/7.14 |

OTHER PUBLICATIONS

Aech, Barbara, et al. "Answering a request for proposal—challenges and proposed solutions." International Working Conference on Requirements Engineering: Foundation for Software Quality. Springer, Berlin, Heidelberg, 2012. (Year: 2012).*

* cited by examiner

EXPERT RESPONSE TEAM ASSEMBLER SOLUTION

CROSS-REFERENCE TO RELATED APPLICATIONS

This application claims the benefit of priority of U.S. Provisional Patent Application No. 61/919,241 filed Dec. 20, 2013 and entitled "AUTOMATION TOOL FOR ASSEMBLING AN EXPERT RESPONSE TEAM," which is hereby incorporated by reference in its entirety.

FIELD OF THE DISCLOSURE

The instant disclosure relates to document systems. More specifically, this disclosure relates to generating documents.

BACKGROUND

Companies, and in particular service-providing companies, often generate business by responding to requests for proposals. A potential client may specify in a request for proposal (RFP) particular services that it desires the company to provide. The company then must assemble a proposal to respond to the request for proposal. The potential client chooses to issue work and hire a company based on the proposals offered by several companies. Thus, it is important that the proposal offered by a company assigns the company's best match of assets and talent to the work outlined in the request for proposal.

Figure 1:
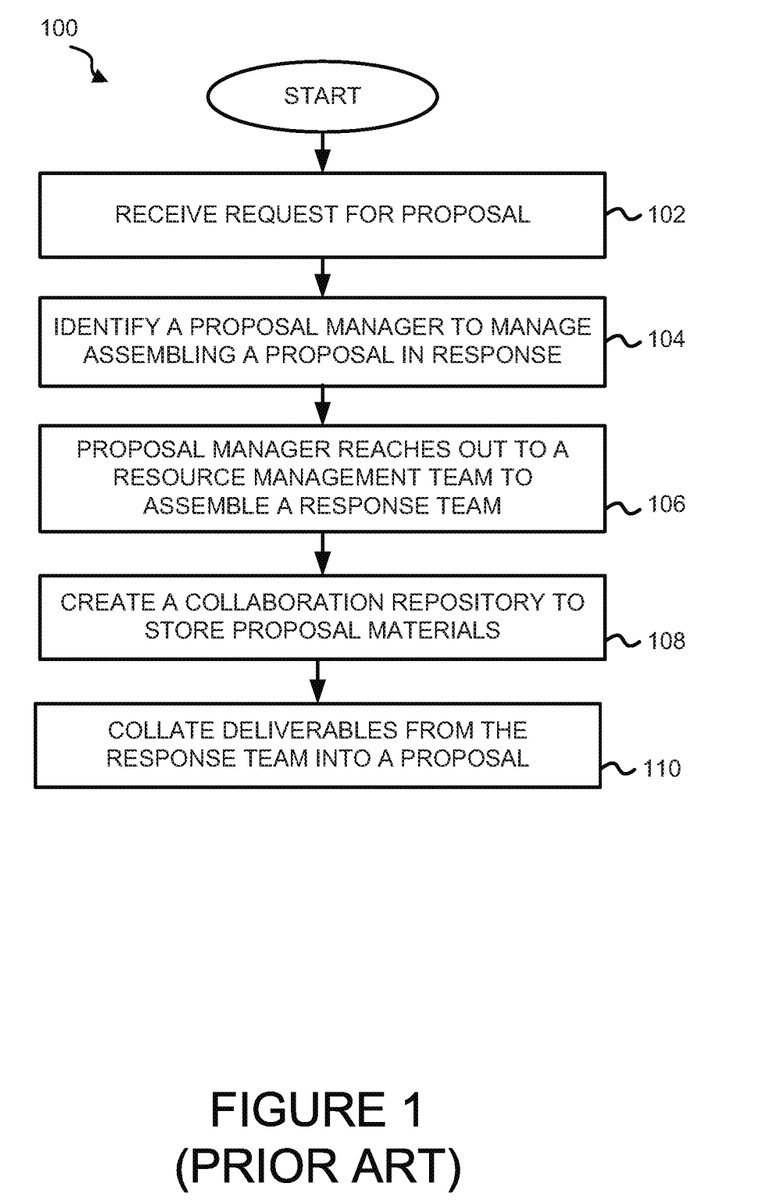
FIG. 1 illustrates a flow chart of a conventional method of responding to a request for proposal.

Conventionally, proposals are assembled by a sales team at the company in response to the request for proposal. FIG. 1 illustrates a flow chart of a conventional method of responding to a request for proposal. A method 100 begins at block 102 with a sales team of a company receiving a request for proposal. Then, at block 104, the company identifies a proposal manager to manage assembling a proposal in response to the RFP. At block 106, the proposal manager reaches out to a resource management team to assemble a response team for assembling the proposal.

Assembling the response team is an important part of the proposal process. The response team identified for the proposal may often determine the likelihood of success of the proposal, particularly for services-oriented companies. Each company responding to the proposal attempts to place their best experts for working on the project in the proposal. However, selecting experts may be a difficult process.

After selection of a team for assembling the proposal, the team must work to generate the contents of the proposal. At block 108, the proposal manager may create a collaboration repository to store proposal materials and to store a plan for identifying tasks and assigning tasks to response team members. Individual response team members may complete tasks and store deliverables in the collaboration repository. At block 110, the proposal manager may collate deliverables from the response team and consolidate them into a proposal.

In the conventional methods described above, proposals may be formed as part of a manual process led by the proposal manager. A significant amount of manual review is required of the proposal manager and the response team. The selection of experts for the response team may not be an optimal selection due to time constraints on the proposal manager and the subjective nature of the proposal manager's selection. Further, the proposal manager may rely on their limited experience with prior proposals and thus not be aware of possible experts with more recent experience or more particular experience related to the proposal.

SUMMARY

Technology may be used to modify and improve the process of assembling a response. For example, a computer program product or specifically-configured processor may be used to improve the quality of experts selected for a proposal and reduce the time consumed to assemble a proposal in response to request for proposal (RFP). Databases may be used to store information regarding experts, which allows more precise selection of experts for inclusion in a proposal by removing some subjectivity of the selection of experts. Such a database of experts may also be more frequently updated with recent experience obtained by the experts to provide better expert matches to topics in a proposal. A proposal manager may assemble a proposal using such a database and a workflow processing system having access to the database. The computer program product or specifically-configured processor may access a database to process data relating to the company's assets and potential experts.

According to one embodiment, a method may include identifying topics of interest in a request for proposal; identifying a credible expert based, at least in part, on the identified key topics; accessing time availability of the credible expert; requesting approval from a supervisor for participation by the credible expert, wherein the approval request includes the time availability of the credible expert; and assembling a response to the request for proposal that identifies the credible expert when approval from the supervisor is received.

According to another embodiment, a computer program product may include a non-transitory computer readable medium having code to perform the steps of identifying topics of interest in a request for proposal; identifying a credible expert based, at least in part, on the identified key topics; accessing time availability of the credible expert; requesting approval from a supervisor for participation by the credible expert, wherein the approval request includes the time availability of the credible expert; and assembling a response to the request for proposal that identifies the credible expert when approval from the supervisor is received.

According to a further embodiment, an apparatus may include a processor and a memory coupled to the processor. The processor may be configured to perform the steps of identifying topics of interest in a request for proposal; identifying a credible expert based, at least in part, on the identified key topics; accessing time availability of the credible expert; requesting approval from a supervisor for participation by the credible expert, wherein the approval request includes the time availability of the credible expert; and assembling a response to the request for proposal that identifies the credible expert when approval from the supervisor is received.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 2:
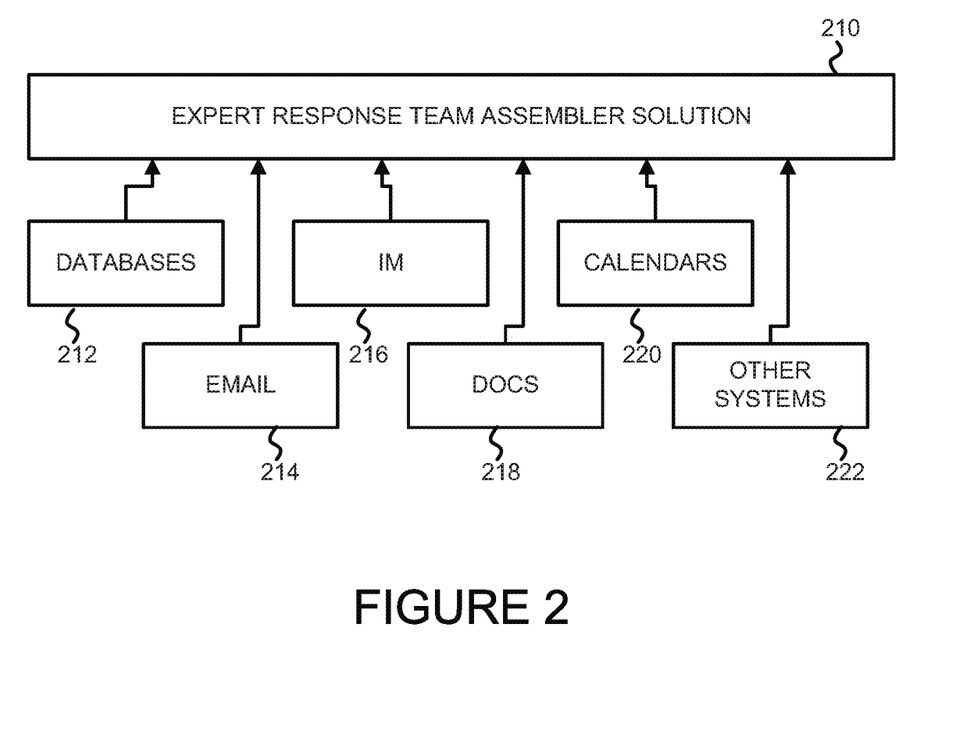
FIG. 2 is a block diagram illustrating interaction of an expert response team assembler solution with other components according to one embodiment of the disclosure.

FIG. 2 is a block diagram illustrating interaction of an expert response team assembler solution with other components according to one embodiment of the disclosure. An expert team assembler solution 210 may operate at a high level over other systems 212, 214, 216, 218, 220, and/or 222. For example the team assembler solution 210 may have an interface for communicating with these lower layer systems through connections to a database system 212, an email system 214, an instant messaging system 216, a document system 218, a calendar system 220, and/or other systems 222. The assembler solution 210 may read and/or write data through interfaces to systems 212, 214, 216, 218, 220, and/or 222. These interfaces may be, for example, application programming interfaces (APIs) exposed by the systems 212, 214, 216, 218, 220, and/or 222.

For example, the assembler solution 210 may access document system 218 to access a word document file, a spreadsheet file, a database file, a text file, and/or other files. In one embodiment, the assembler solution 210 may access resumes for available experts through the document system 218.

In another example, the assembler solution 210 may access database system 212 to access topic mappings. In one embodiment, the assembler solution 210 may access databases of topic indexes and experience for experts stored in a database through database system 212.

In a further example, the assembler solution 210 may access email system 214 to send emails to identified members of the response team and receive responses from members of the response team. In one embodiment, the assembler solution 210 may access email system 214 to send to a potential response team member a request to participate in the response team. The email may include a voting button to receive a response from the potential member. The assembler solution 210 may access the potential member's response through the email system 214. The assembler solution 210 may alternatively utilize the instant message system 216 to communicate with potential members. For example, after creating a message for communication to potential team members, the assembler solution 210 may determine whether a potential team member's status on instant messaging system 216 is set to "available." If so, then the assembler solution 210 may communicate with the potential team member through the instant messaging system 216. If instead the potential team member's status on instant messaging system 216 is set to "away" or "busy," then the assembler solution 210 may communicate with the potential team member through the email system 214.

In another example of accessing lower layer systems, the assembler solution 210 may access calendar system 220 to review availability for experts or other potential team members. In one embodiment, when a potential response team member is identified, a schedule for that member may be accessed through the calendar system 220. By accessing individual calendars within the calendar system 220, the assembler solution 210 may automatically determine whether a potential member has sufficient availability to participate in the response team. For example, determining availability may include determining from the calendar system 220 how many other response teams the potential member is participating in. In another example, availability may be determined by determining from the calendar system 220 a percentage of time the potential member is free compared to busy.

Figure 3:
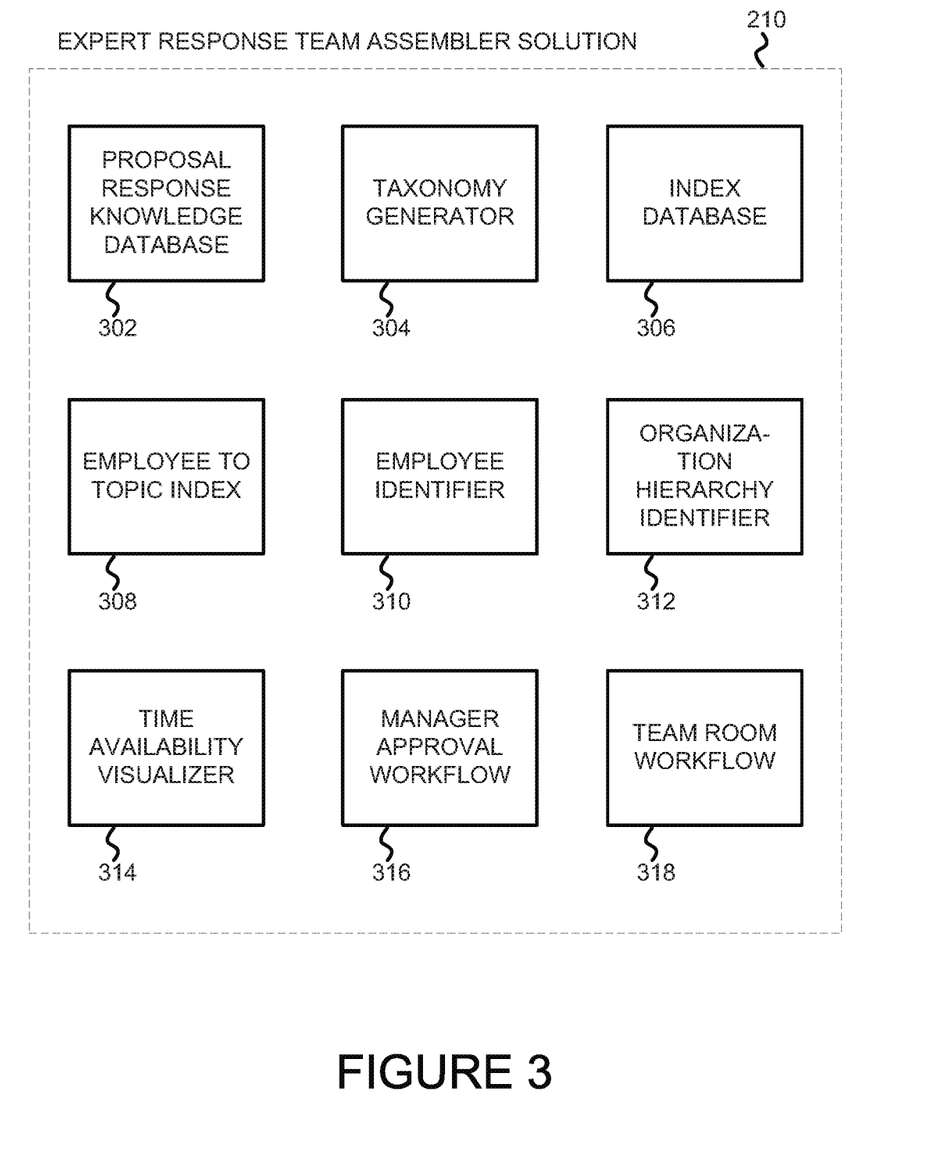
FIG. 3 is a block diagram illustrating an expert response team assembler solution according to one embodiment of the disclosure.

The assembler solution 210 may include various modules for executing functions related to assembling an expert response team. FIG. 3 is a block diagram illustrating an expert response team assembler solution according to one embodiment of the disclosure. The assembler solution 210 may include modules 302, 304, 306, 308, 310, 312, 314, 316, and/or 318. Each of these modules may be specific hardware programmed to execute code for performing various functions, or these modules may be portions of software code within a single or different software solutions executing at a high level on a computer system. Additionally, these modules may store data and provide an interface for accessing the stored data. The computer system executing the assembler solution 210 may also host other functionality, such as the database system 212, the email system 214, the IM system 216, the document system 218, and the calendar system 220. When the systems 212, 214, 216, 218, 220, and 222 are executed on a computer system separate from the assembler system 210, the assembler system 210 may communicate with systems 212, 214, 216, 218, 220, and/or 222 through a network interface and/or various application programming interfaces (APIs) available for each of the systems 212, 214, 216, 218, 220, and/or 222.

One module within the assembler solution 210 may be a proposal response knowledge database module 302. Module 302 may contain topics, some of which are designated more important than others, to be addressed in a proposal. For example, module 302 may store data, including a list of topics relevant to a proposal. The list of topics may be manually inserted by a proposal manager. In another example, module 302 may include code to scan a proposal and automatically generate a list of topics for the proposal. The module may generate the list of topics by selecting keywords from the proposal and/or matching keywords in the proposal to pre-identified keywords. Thus, variations in terminology from potential clients may be normalized across all proposals to assist in the identification of team members.

Another module within the assembler solution 210 may be a taxonomy generator module 304. Module 304 may identify relationships and classifications of topics.

A further module within the assembler solution 210 may be an index database module 306. Module 306 may store topics discussed in an enterprise or company. The module 306 may include code for accessing data, for example, in the email system 214 and the instant messaging system 216 of FIG. 2. By scanning these systems, the module 306 may match potential experts to topics.

A further module within the assembler solution 210 may be an employee identifier module 310. Module 310 may identifier particular employees as an expert and/or influencer on particular topics. For example, module 310 may include code for scanning information in module 306 to determine an influence score for each employee on each topic. Module 310 may determine an employee has reached an expert level on a particular topic by comparing the influence scores to thresholds or ranking employees for each topic based on the influence scores.

Another module within the assembler solution 210 may be an organization hierarchy identifier module 312. Module 312 may store information about a hierarchical organization of a business. For example, the hierarchical organization may list employees, along with their supervisors, and their supervisor's supervisors, etc. Data may be retrieved from, for example, the database system 212. Hierarchy information may also be obtained, for example, by scanning conversations in email system 214 and instant messaging system 216 and inferring a hierarchical organization.

A further module within the assembler solution 210 may be a time availability visualizer module 314. Module 314 may store information regarding the time availability information for employees. Module 314 may retrieve the information from, for example, the calendar system 220. Module 314 may also include code for forecasting an employee's availability based on information in the email system 214 and a list of scheduled holidays and vacations in the calendar system 220. Module 314 may also include code for generating a visualization, such as a graph, of employee availability.

Another module within the assembler solution 210 may be a manager approval workflow module 316. Module 316 may include workflow to seek approval from an employee's manager to allow participation in a proposal response process. For example, when module 310 identifies an employee as an appropriate expert for a proposal and module 314 determines the employee has sufficient time availability, module 316 may control email system 214 or instant messaging system 216 to send a message to a manager of the employee identified by module 312. The manager may respond to the communication to approve or deny use of the employee in the proposal response process.

A further module within the assembler solution 210 may be a team room workflow module 318. Module 318 may include a workflow for creating a collaboration team room with experts as members and an onboarding process for the response team. For example, module 318 may include code to access the document system 218 to create a special folder for the proposal response process and add permission to the folder for access by team members identified by module 310. To provide access to the members, module 318 may access database systems 212 to lookup network usernames for the identified members of the response team and assign their usernames read and write privileges for the created folder.

Figure 4:
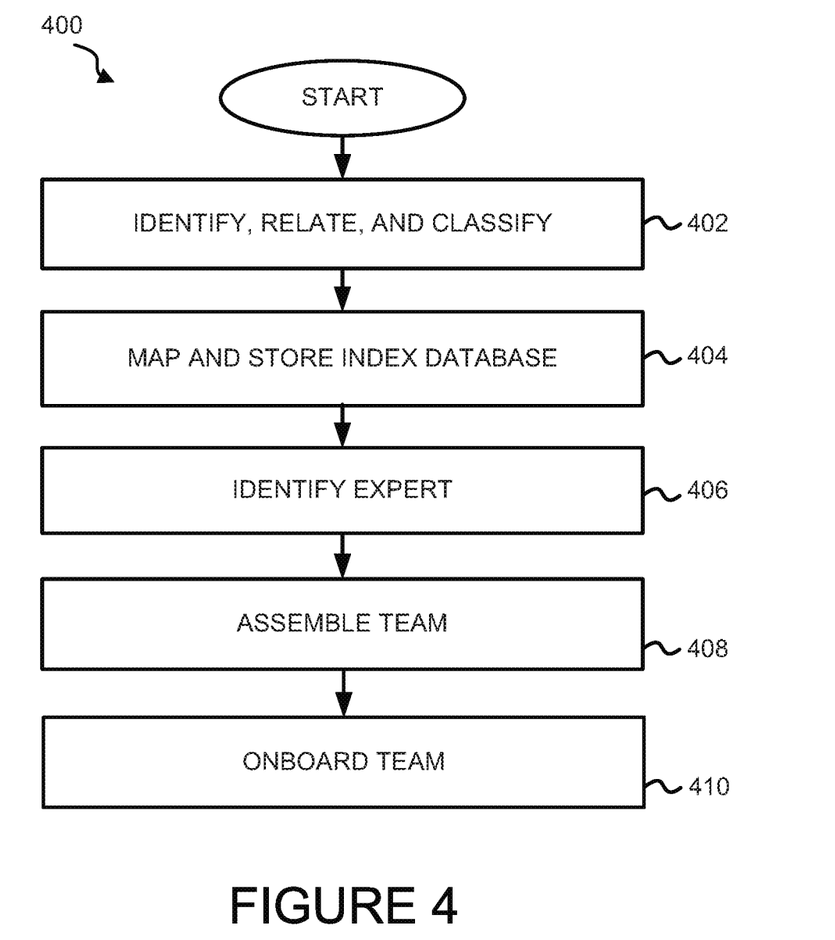
FIG. 4 is a flow chart illustrating a method of onboarding a team as part of assembling an expert response team according to one embodiment of the disclosure.

The assembler solution 210 and the various modules 302, 304, 306, 308, 310, 312, 314, 316, and/or 318 may be invoked during execution of a method for automatically onboarding a team as part of assembling an expert response team. FIG. 4 is a flow chart illustrating a method of onboarding a team as part of assembling an expert response team according to one embodiment of the disclosure. A method 400 begins at block 402 with identifying, relating, and classifying. Block 402 may include, for example, inputting a proposal document to generate a proposal response knowledge database in module 302. Block 402 may also include generating a taxonomy in module 304 using the proposal knowledge database to relate and classify all key topics for the proposal. Block 402 may further include ensuring that all key topics are covered while responding to the proposal.

Then, at block 404, an index database may be created by mapping and storing. Block 404 may include storing all important topics discussed in the enterprise. Block 404 may also include mapping the topics to a specific employee, business unit, department, region, and/or country.

Then, at block 406, an expert may be identified. Block 406 may include identifying an expert, such as within module 310. In one embodiment, identification may be performed with a single click by using the proposal response knowledge database created in block 402 and the index database created in block 404 to identify all experts by topics. Block 406 may also include listing all experts by topics. Block 406 may further include searching experts by topics.

Next, at block 408, a response team may be assembled. Block 408 may include identifying an expert's organization hierarchy, such as in module 312. Block 408 may also include understanding an expert's availability based on a work forecast and holiday appointments in module 314. Block 408 may further including sending a pre-approved request to the expert's manager to allow the expert's participation in a proposal response process.

Then, at block 410, the response team may be onboarded. Block 410 may include creating a collaboration team room with experts as members, such as in module 318. Block 410 may also include onboarding a team with details about deadlines, introduction to other team members, and sending a proposal kick off meeting invite based on calendar appointments, such as through the email system 214 and the calendar system 20.

Figure 5:
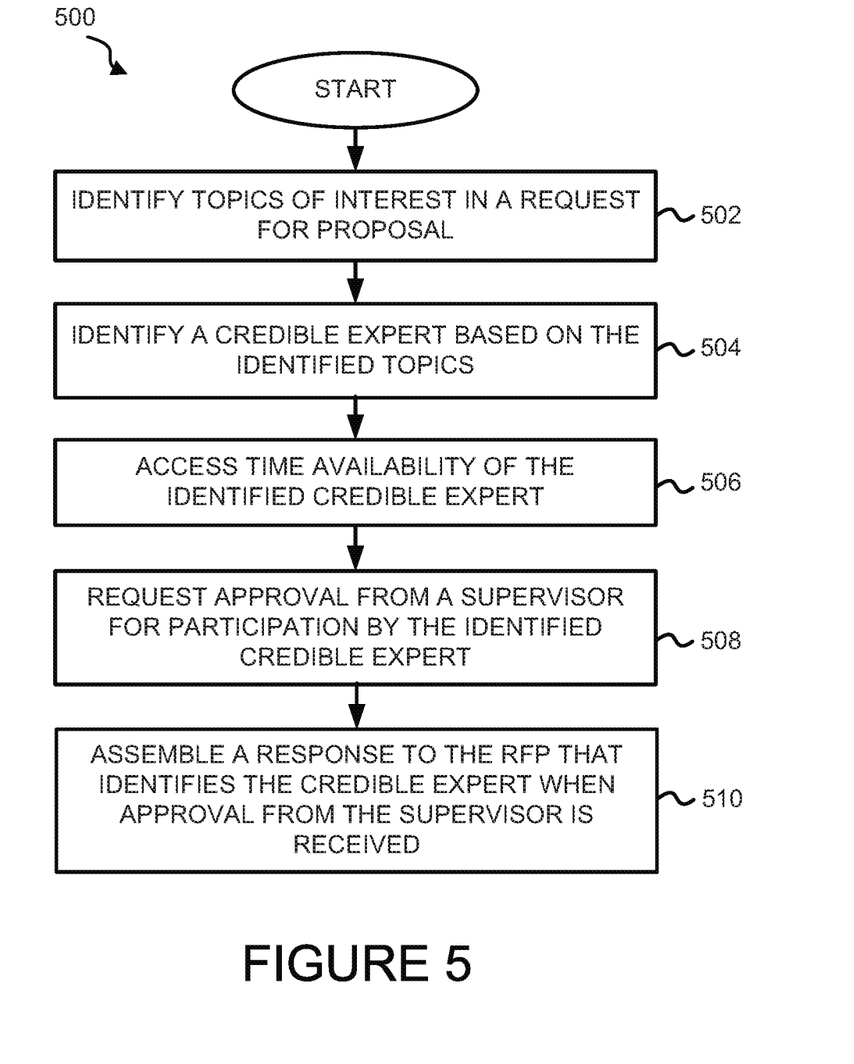
FIG. 5 is a flow chart illustrating a method of responding to a request for proposal according to one embodiment of the disclosure.

An assembler solution, the modules contained therein, and the various methods described above may be implemented for creating a response to a request for proposal from a potential client. FIG. 5 is a flow chart illustrating a method of responding to a request for proposal according to one embodiment of the disclosure. A method 500 may begin at block 502 with identifying topics of interest in a request for proposal (RFP). At block 504, a credible expert may be identified based on the identified topics in the proposal at block 502. Block 504 may include, for example, identifying a credible expert by accessing resumes stored in a database. Block 504 may also include identifying the credible expert by cross-referencing the topics of interest in the proposal with an index mapping topics to potential experts. At block 506, a time availability of the expert identified at block 504 may be accessed to determine whether the expert may have time to participate. Block 506 may include, for example, accessing time availability by accessing calendar information within a database in a separate system. At block 508, approval may be requested from the expert's supervisor for participation by the identified credible expert of block 504. Block 508 may include, for example, accessing an organization hierarchy for the credible expert and identifying the supervisor. Then, at block 510 a response may be assembled to the request for proposal of block 502, in which the response may identify the credible expert when approval is obtained from the supervisor at block 508. The method 500 may also include creating a website portal for access by the credible expert and a group of participants, in which the website portal comprises information relating to the proposal.

An expert response team assembler solution described above may save costs by identifying experts in an objective way. For example, the team assembler solution may reduce or eliminate a resource manager's approach of performing key word searches to identify response team members, reduce or eliminate a manager's approach of guessing to suggest team members for the response team, and/or reduce duplication of effort during selection of response team members. The team assembler solution may also accelerate the processor of assembling team members by reducing the time required to perform certain tasks through automation. For example, only potential team members who are available may be selected and/or pre-approval may be obtained from managers for participation of their employees in the proposal response. The team assembler solution may further improve a quality of the ultimate response prepared. For example, the response team may be based on expert knowledge and credibility as determined through objective analysis and/or relevancy of team members may be improved by searching the team member's recent contributions.

Figure 6:
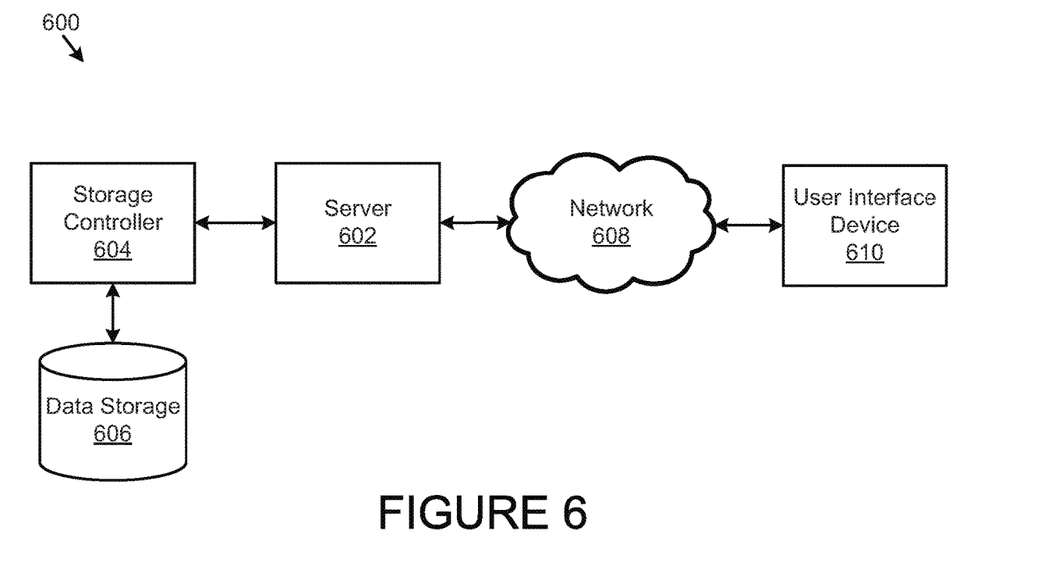
FIG. 6 is a block diagram illustrating a computer network according to one embodiment of the disclosure.

FIG. 6 illustrates one embodiment of a system 600 for an information system, including a server for hosting team rooms and generating a response to a request for proposal (RFP). The system 600 may include a server 602, a data storage device 606, a network 608, and a user interface device 610. In a further embodiment, the system 600 may include a storage controller 604, or storage server configured to manage data communications between the data storage device 606 and the server 602 or other components in communication with the network 608. In an alternative embodiment, the storage controller 604 may be coupled to the network 608.

In one embodiment, the user interface device 610 is referred to broadly and is intended to encompass a suitable processor-based device such as a desktop computer, a laptop computer, a personal digital assistant (PDA) or tablet computer, a smartphone, or other mobile communication device having access to the network 608. In a further embodiment, the user interface device 610 may access the Internet or other wide area or local area network to access a web application or web service hosted by the server 602 and may provide a user interface for accessing and reviewing expert information.

The network 608 may facilitate communications of data between the server 602 and the user interface device 610. The network 608 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 7:
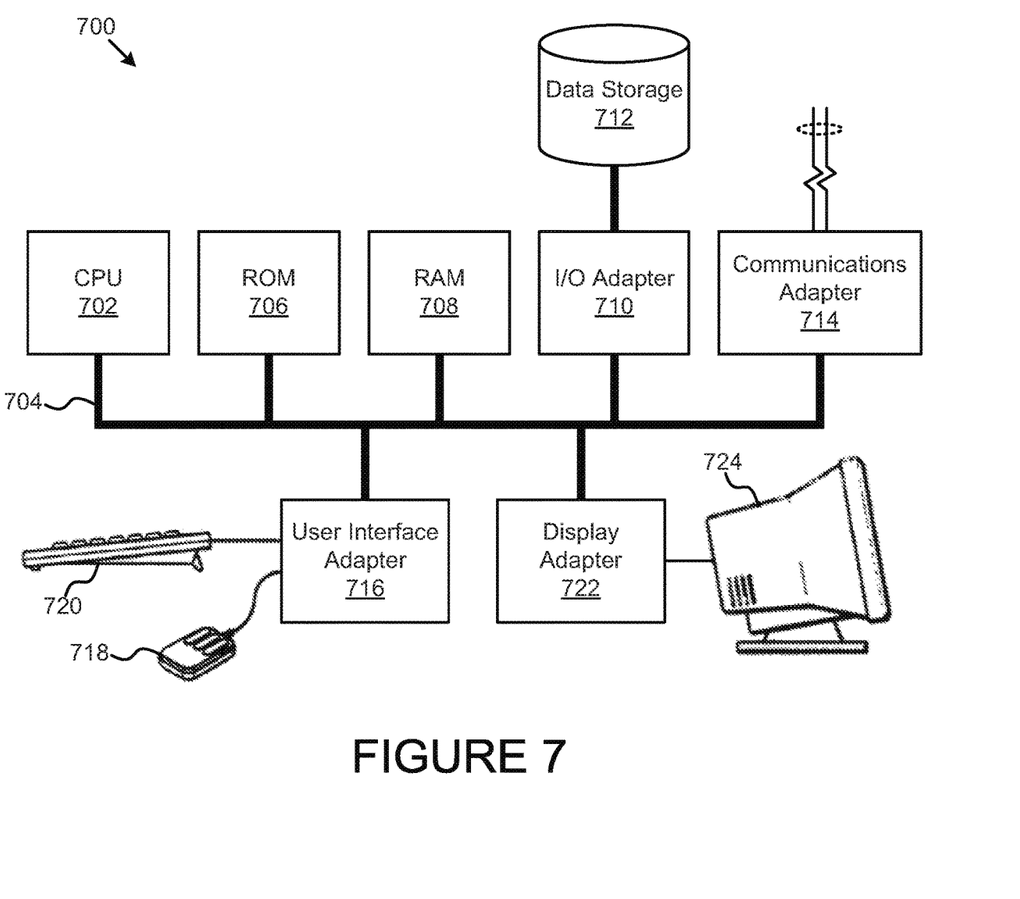
FIG. 7 is a block diagram illustrating a computer system according to one embodiment of the disclosure.

FIG. 7 illustrates a computer system 700 adapted according to certain embodiments of the server 602 and/or the user interface device 610. The central processing unit ("CPU") 702 is coupled to the system bus 704. Although only a single CPU is shown, multiple CPUs may be present. The CPU 702 may be a general purpose CPU or microprocessor, graphics processing unit ("GPU"), and/or microcontroller. The present embodiments are not restricted by the architecture of the CPU 702 so long as the CPU 702, whether directly or indirectly, supports the operations as described herein. The CPU 702 may execute the various logical instructions according to the present embodiments.

The computer system 700 may also include random access memory (RAM) 708, which may be synchronous RAM (SRAM), dynamic RAM (DRAM), synchronous dynamic RAM (SDRAM), or the like. The computer system 700 may utilize RAM 708 to store the various data structures used by a software application. The computer system 700 may also include read only memory (ROM) 706 which may be PROM, EPROM, EEPROM, optical storage, or the like. The ROM may store configuration information for booting the computer system 700. The RAM 708 and the ROM 706 hold user and system data, and both the RAM 708 and the ROM 706 may be randomly accessed.

The computer system 700 may also include an input/output (I/O) adapter 710, a communications adapter 714, a user interface adapter 716, and a display adapter 722. The I/O adapter 710 and/or the user interface adapter 716 may, in certain embodiments, enable a user to interact with the computer system 700. In a further embodiment, the display adapter 722 may display a graphical user interface (GUI) associated with a software or web-based application on a display device 724, such as a monitor or touch screen.

The I/O adapter 710 may couple one or more storage devices 712, such as one or more of a hard drive, a solid state storage device, a flash drive, a compact disc (CD) drive, a floppy disk drive, and a tape drive, to the computer system 700. According to one embodiment, the data storage 712 may be a separate server coupled to the computer system 700 through a network connection to the I/O adapter 710. The communications adapter 714 may be adapted to couple the computer system 700 to the network 608, which may be one or more of a LAN, WAN, and/or the Internet. The user interface adapter 716 couples user input devices, such as a keyboard 720, a pointing device 718, and/or a touch screen (not shown) to the computer system 700. The keyboard 720 may be an on-screen keyboard displayed on a touch panel. The display adapter 722 may be driven by the CPU 702 to control the display on the display device 724. Any of the devices 702-722 may be physical and/or logical.

The applications of the present disclosure are not limited to the architecture of computer system 700. Rather the computer system 700 is provided as an example of one type of computing device that may be adapted to perform the functions of the server 602 and/or the user interface device 610. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system may be virtualized for access by multiple users and/or applications.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media. Additionally, the firmware and/or software may be executed by processors integrated with components described above.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computing device for automatically generating a response to a request for proposal, the computing device comprising:
    a temporary memory;
    a permanent memory;
    at least one processor coupled to the temporary and permanent memory, wherein the at least one processor in operation is programmed to run a response assembler solution that has an electronic interface to at least one database system, an email system, a document system and a calendar system within a network connected to the computing device, the response assembler solution being programmed to perform operations including:
        identifying, by the processor, topics of interest in the request for proposal by electronically scanning for keywords in the request for proposal;
        identifying, by the processor, at least one person from the database system based on the identified topics;
        accessing, by the processor, a time availability of the person by electronically accessing the calendar system for the person;
        requesting, by the processor, approval from a supervisor for participation by the person by electronically accessing the email system and sending an email requesting approval to the supervisor; and
        assembling, by the processor, a response to the request for proposal that identifies the person when approval from the supervisor is received by reply email;
    wherein a response to a request for proposal is generated automatically by the computing device without human intervention, which results in a faster response time, a more objective response and an improved quality of the response.

2. The computing device of claim 1, further including the response assembler solution being programmed to perform operations including;
    scanning, by the processor, emails in the email system to identify topics discussed by individuals.

3. The computing device of claim 2, further including:
    assessing, by the processor, knowledge levels of the individuals corresponding to the identified topics.

4. The computing device of claim 3, further including:
    assembling, by the processor, a response team of at least one person for the response.

5. The computing device of claim 1, wherein identifying a person includes cross referencing, by the processor, the topics with an index mapping topics to potential persons.

6. A computer program product for automatically generating a response to a request for proposal without human intervention, the computer program product comprising:
    a response assembler solution that has an electronic interface to at least one database system, an email system, a document system and a calendar system within a network connected to a computing device having a processor, the response assembler solution being programmed to perform operations including:
        identifying, by the processor, topics of interest in the request for proposal by electronically scanning for keywords in the request for proposal;
        identifying, by the processor, an expert from the database system based on the identified topics;
        accessing, by the processor, time availability of the expert by electronically accessing the calendar system;
        requesting, by the processor, approval from a supervisor for participation by the expert by accessing the email system and sending an email requesting approval to the supervisor; and
        assembling, by the processor, a response to the RFP that identifies the expert when approval from the supervisor is received by reply email;
    wherein a response to a request for proposal can be generated automatically by the computing device, which results in a faster response time, a more objective response and an improved quality of the response.

7. The computing device of claim 6, further including the response assembler solution being programmed to perform operations including;
    scanning, by the processor, emails in the email system to identify topics discussed by individuals.

8. The computing device of claim 7, further including:
assessing, by the processor expertise levels corresponding to the identified topics.

9. The computing device of claim 8, further including:
assembling, by the processor, a response team for the response.

10. The computing device of claim 9, wherein identifying an expert includes cross referencing, by the processor, the topics with an index mapping topics to potential experts.

* * * * *